United States Patent [19]
Morin

[11] Patent Number: 5,372,244
[45] Date of Patent: Dec. 13, 1994

[54] CONVEYOR BELT SCRAPER

[76] Inventor: Normand J. Morin, 143A Gibson St., Parry Sound, Canada, P2A 1Y1

[21] Appl. No.: 137,932

[22] Filed: Oct. 19, 1993

[30] Foreign Application Priority Data

Oct. 19, 1992 [GB] United Kingdom ............... 9221901

[51] Int. Cl.⁵ ........................................... B65G 45/00
[52] U.S. Cl. .................................................. 198/499
[58] Field of Search ............... 198/497, 499; 15/256.5, 15/256.51

[56] References Cited

U.S. PATENT DOCUMENTS

| | | | |
|---|---|---|---|
| 4,290,520 | 9/1981 | Rhodes | 198/499 |
| 4,877,122 | 10/1989 | Morin | 198/499 |
| 5,048,667 | 9/1991 | Morin | 198/499 |
| 5,213,197 | 5/1993 | Mohri | 198/499 |

Primary Examiner—Joseph E. Valenza

[57] ABSTRACT

The belt scraper includes a scraper blade of polyurethane, which lies coiled inside a housing. A rubber seal prevents leakage of fluid pressure from inside the housing. The seal has a lip, a tightly compressed bead, and a connecting portion which isolates the lip from the bead. A dust/dirt seal prevents scraped debris from contacting the seal.

2 Claims, 7 Drawing Sheets

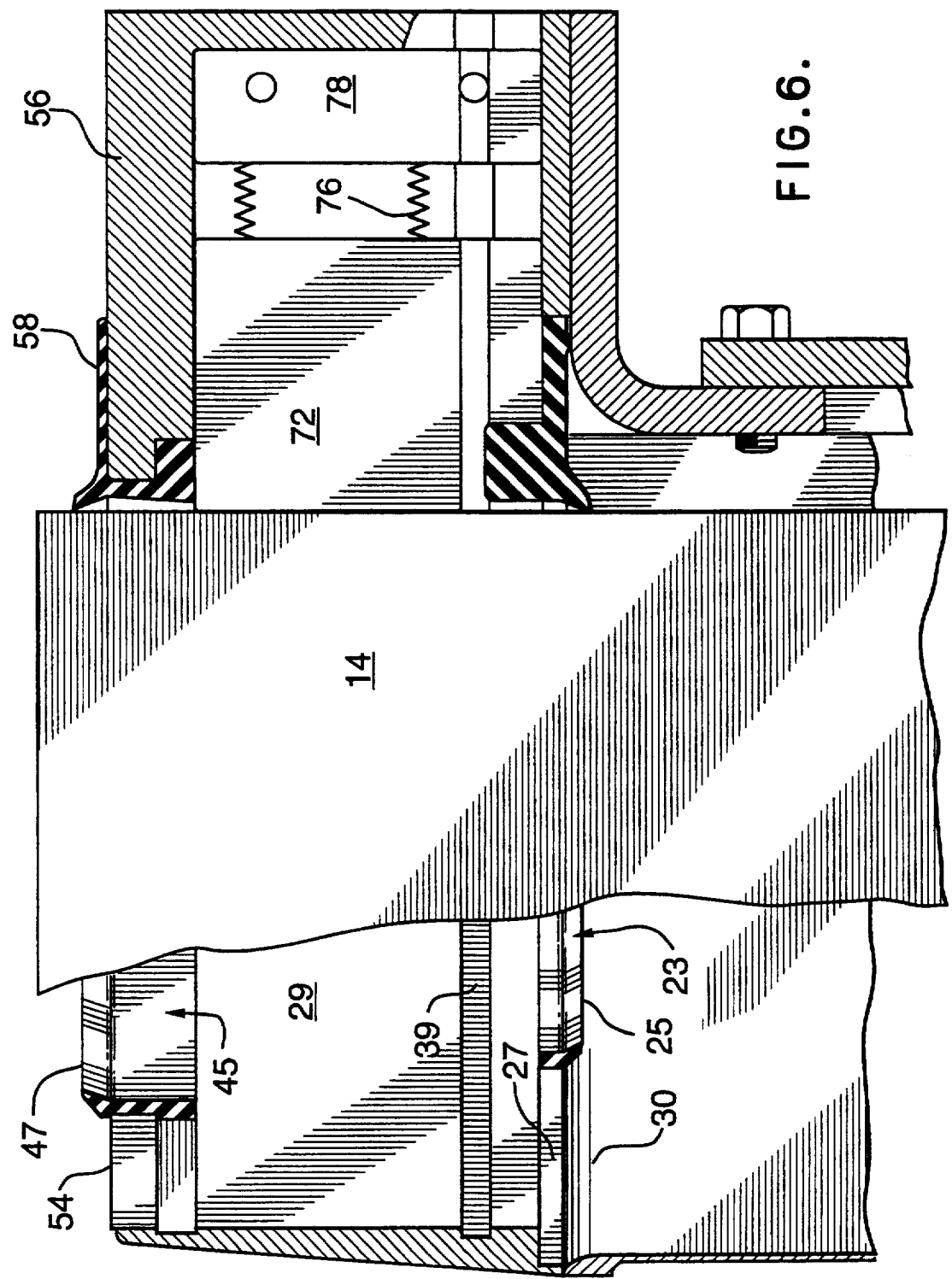

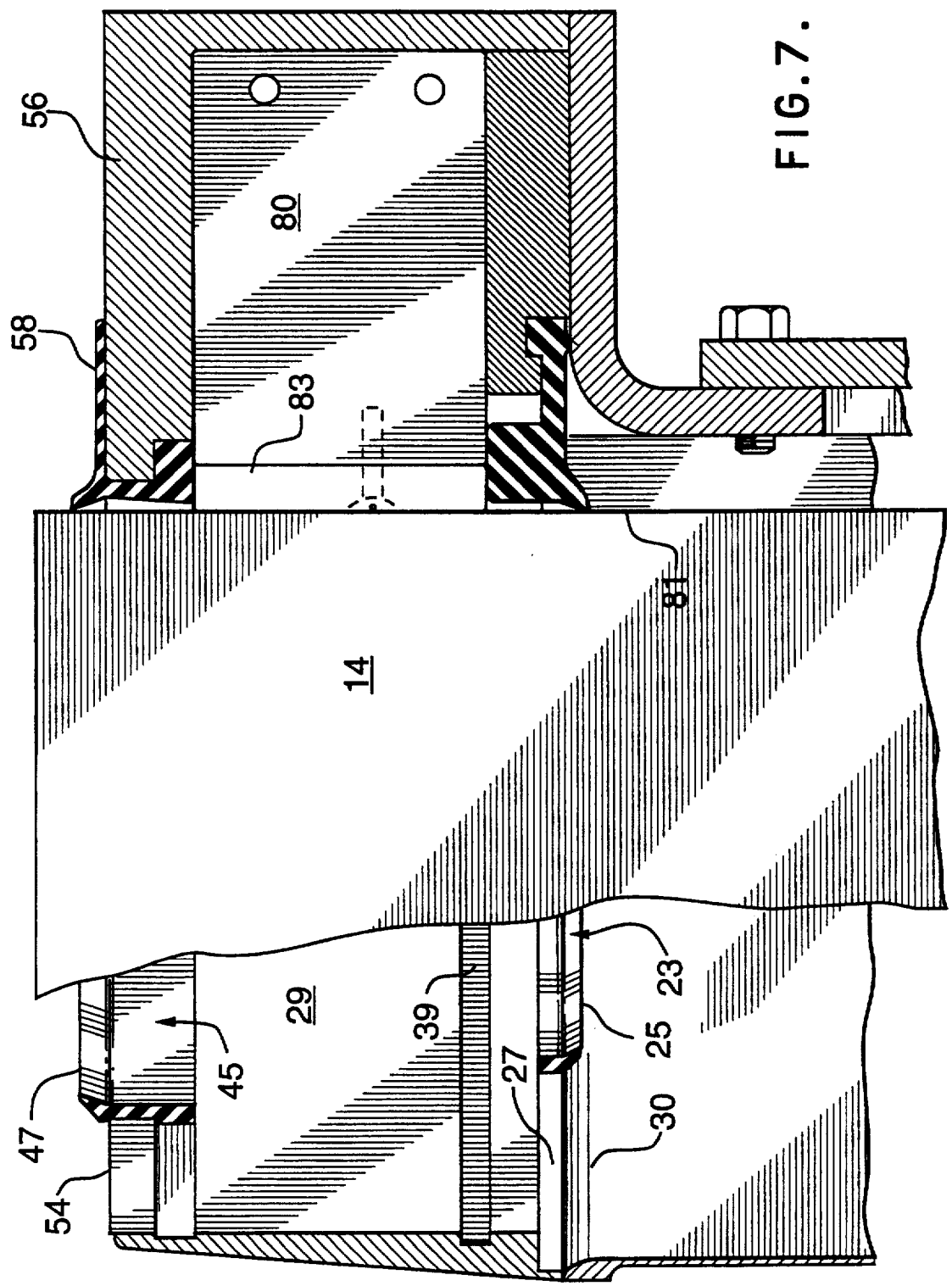

CONVEYOR BELT SCRAPER

This invention relates to a scraper for a conveyor belt, of the kind used in mines etc. An example of a scraper of the kind to which the invention relates is shown in U.S. Pat. No. 5,048,667 Sep. 17, 1991, MORIN)

FIG. 6 is an elevation corresponding to FIG. 3 of a scraper, some of the components of which have been modified;

FIG. 7 is an elevation corresponding to FIG. 3 of a scraper, some of the components of which have been further modified;

The structures shown in the accompanying drawings and described below are examples which embody the invention. It should be noted that the scope of the invention is defined by the accompanying claims, and not necessarily by specific features of exemplary embodiments.

Figure 1:
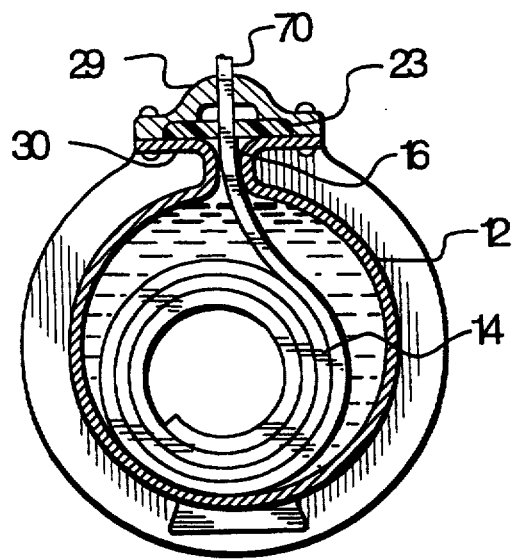
FIG. 1 is a side elevation, in cross-section, of a conveyor belt scraper which incorporates the invention.

FIG. 1 shown a housing 12 in which is contained a blade 14 of a belt scraper. The blade protrudes out through a slot 16 in the top of the housing, for operative contact with the moving conveyor belt 18, which is to be scraped. The blade and housing are of the type as illustrated generally in MORIN.

The interior of the housing 12 contains water, and the water is at a hydrostatic pressure, during operation of the scraper, of about 150 psi. An actuation system (not shown) urges the housing in the direction towards the belt, thereby pressing the blade 14 against the belt.

As the blade wears, compensatory adjustment is required; typically, the adjustment means takes the form of a charge of water which is forced under pressure into the housing, and which forces an increment of the blade out through the slot 16. The pressure of the water when adjustment is taking place, can, for a moment, be rather higher.

The pressurised water is sealed into the housing by means of a pressure seal 23, made of elastomeric material, The seal 23 seals the slot 16, through which the blade 14 passes. The seal includes a flexible lip 25 which presses against the sides of the blade 14.

The seal 23 fits into a recess 27 formed in a block 29, which is of triangular section. The block 29 is formed as a compression-moulding, from plastic material reinforced with suitable fibres.

The block 29 is secured to the bent-over flange 30 of the housing 12, whereby the seal 23 is compressed between the block 29 and the flange 30. The seal 23 includes a bead 32 which is located, in the cross-sectional view of the seal, some distance away from the lip 25. The bead 32 is especially compressed between the block 29 and the flange 30.

The front and rear sides of the slot 16 tend to separate as the housing is pressurised. The housing 12, typically, is a metre or so in width. (The width of the blade corresponds to the width of the belt being scraped.) The widening of the slot 16, due to distortion of the housing 12, is greatest in the middle of the width of the housing, where the separation of the front and rear sides of the slot can amount to perhaps a millimetre, or even more. The housing 12 is reinforced, in order to keep the widening of the slot 16 to a minimum.

Even though the slot 16 becomes wider when the housing 12 is under pressure, the lip 25 of the seal 23 must not be allowed to break free of its sealing contact with the side of the blade 14. On the other hand, the lip 25 cannot be of too flexible a nature in itself, or the lip might tend to turn "inside out" under conditions of high pressure and slot widening.

Figure 2:
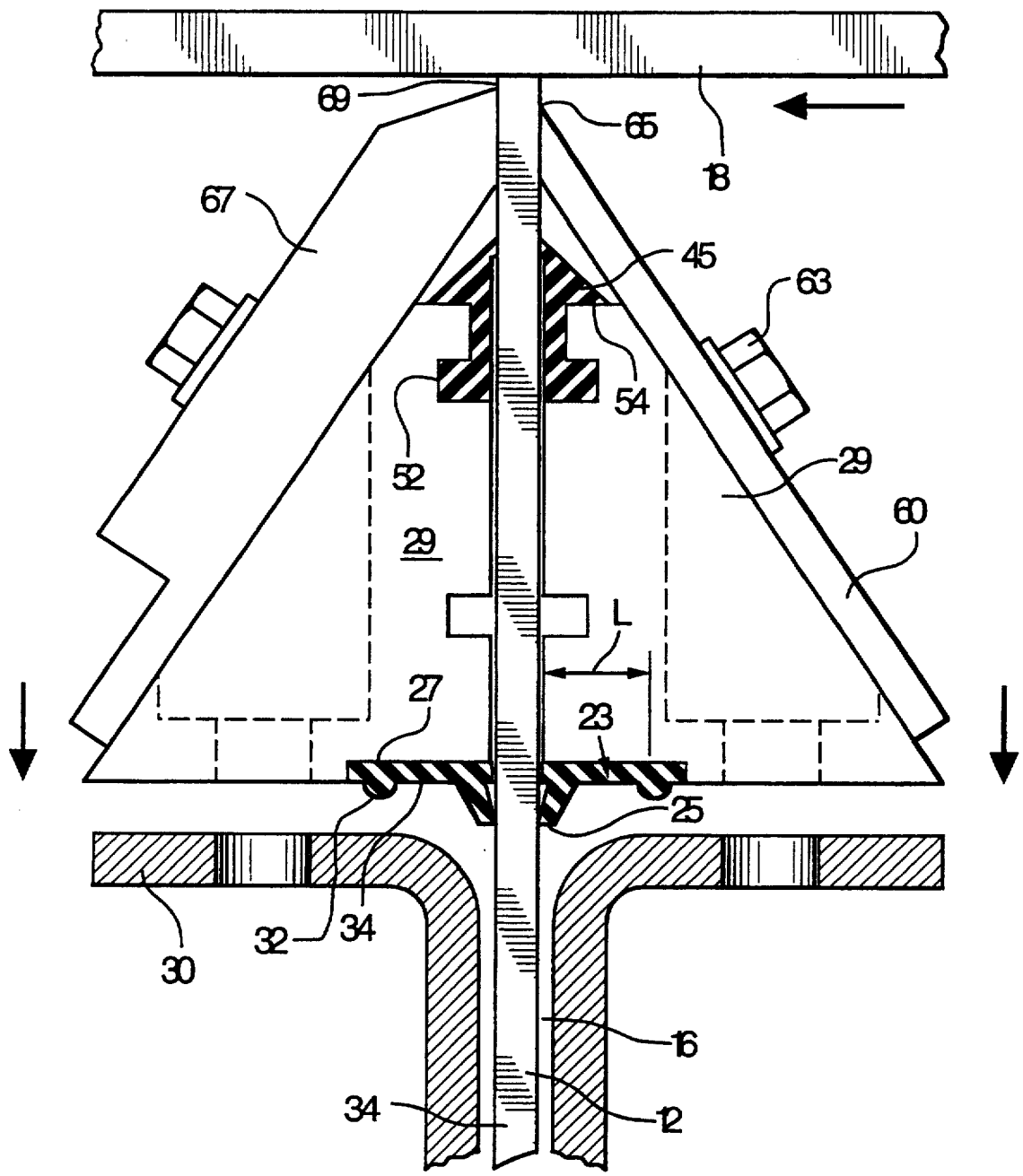
FIG. 2 is a close-up view of a portion of the scraper shown in FIG. 1.

Providing for the lip 25 to maintain sealing contact with the blade 14 at all times is addressed by making the seal 23 of a cross-section that has a long dimension in the direction at right angles to the plane of the blade. Thus, in FIG. 2, the length L is long enough that the lip 25 of the seal is in effect at the end of a long flexible arm 34, whereby the lip can move, if the need arises, to follow the distortions of the housing and the widening of the gap.

The bead 32 is at the end of the cross-section remote from the lip 25; the bead, being thicker than the rest of the seal 23, is compressed much more tightly, and movement of the bead area therefore cannot be expected: but the long arm 34 and the remainder of the seal are so dimensioned as to be relatively free to move within the recess 27, to allow the lip to flow the movement of the sides of the slot or gap 16.

This is not to say the seal 23 is loose in the recess 27: but rather that the compression of the seal is light enough to permit the seal to adjust itself to distortion. The magnitude of the compression of the bead area, on the other hand, does not permit such movement.

Thus it will be seen that the layout of the seal 23 as described is capable of permitting the seal to accommodate widening of the slot or gap, without the lip of the seal tending to break free.

A different sealing problem arises at the edges of the blade 14, as will not be described.

Figure 4:
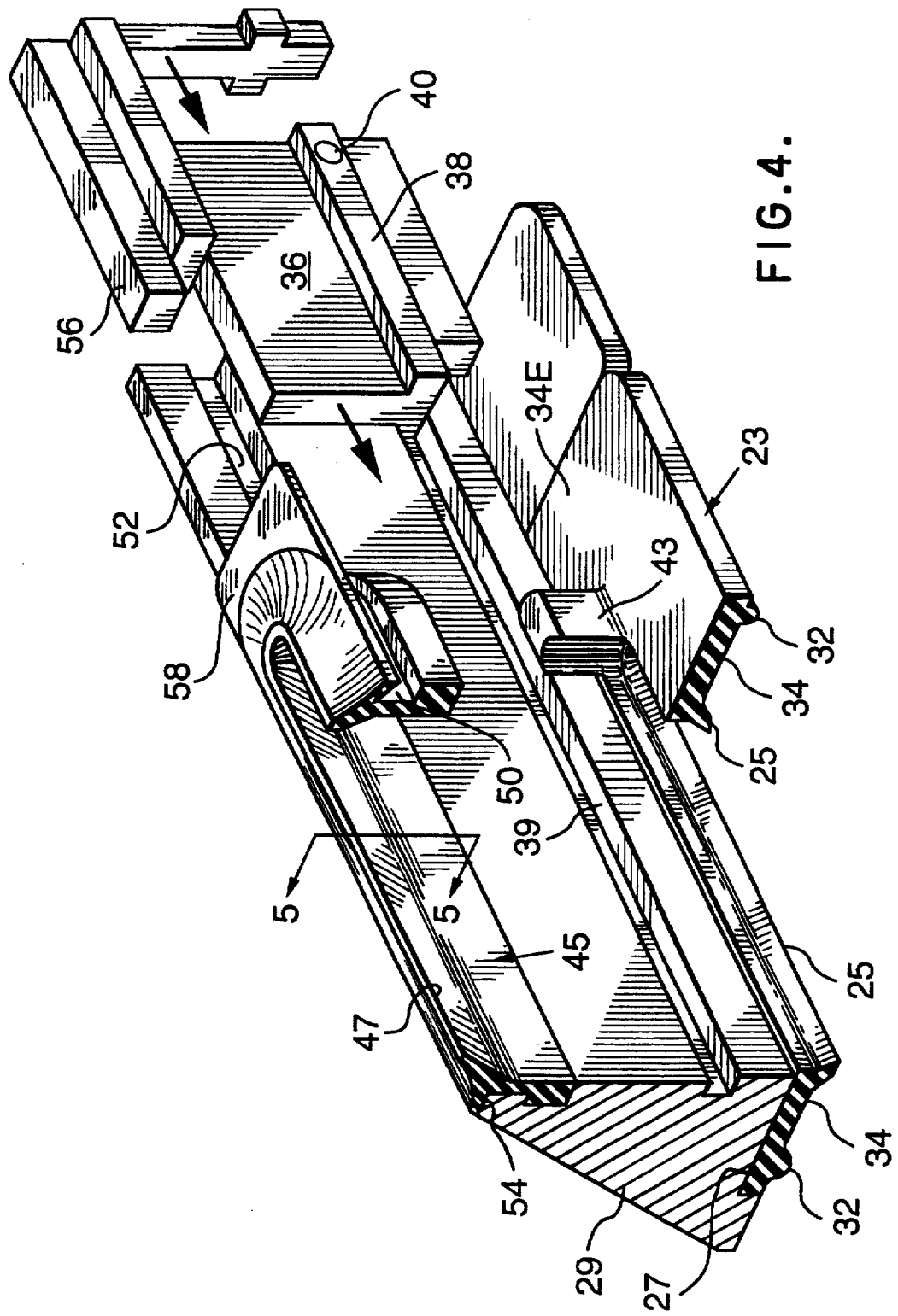
FIG. 4 is a pictorial view of some of the components of the portion of the scraper as shown in FIG. 2.

The left and right edges of the blade are rounded into a semi-circular configuration. As shown in FIG. 4, the lip 25 follows this configuration. The moulded block 29 is longer than the width of the blade, and a fill-in piece 36 is located between the front and rear blocks 29 at the left and right edges of the blade. The fill-in pieces 36 (one at each edge of the blade) are held in place by means of tongues 38 which engage slots 39 in the blocks 29, and by bolts 40.

The distance apart of the left and right fill-in pieces 36 is large enough that the blade 14 is free to slide freely out of the slot 16, but the pieces 36 are close enough to the edges of the blade as to act as abutments, to guide the edges of the blade.

The blade 14 is made of polyurethane which has a high coefficient of thermal expansion. If the blade is of, say, one metre nominal width, the width of the blade can be expected to change by 2 or even 3 millimetres between temperature extremes. Therefore, if the fill-in pieces 36 are just touching the edges of the blade 14 when the blade is fully expanded, there will be a clearance of 2 or 3 mm when the blade is cold, between the blade and the pieces 36.

The seal 23 must be capable of following these expansions and contractions of the blade, without allowing the lip 25 to break sealing contact around the semi-circular configuration of the edge of the blade. Again, the bead 32 area of the seal, being tightly squeezed, cannot be expected to move to accommodate such movements of the blade, but the cross-sectional shape of the seal, in the area of the edge of the blade, is sufficiently resilient as to permit the seal to follow the movement.

It will be understood that the length of the opening in the seal 23, ie the dimension into which the full width of the blade 14 is to fit, is a little smaller than the full width of the blade. As a result, the seal is stretched tightly over the edges of the blade.

In fact, the recess 27 may be made smaller than the seal 23, to the extent that the seal is squeezed inwards, towards the blade, when the seal is assembled into the recess. This is true particularly in regard to the edge-to-edge width of the blade, but it is the case also in regard to the front-to-rear thickness of the blade.

The seal 23 is formed with a raised piece 43. (And there is a corresponding raised piece in respect of the opposite edge of the blade). the fill-in piece 36 is cut back to accommodate the raised piece 43. the raised piece 43 adds some extra resilient toughness to the lip 25 in the region of the edge of the blade, which helps the seal follow such movement as is required.

Thus the seal as described is able to accommodate the widening of the slot due to the pressure in the housing, and is able to accommodate the thermal expansion and contraction of the blade material.

As mentioned, actuators press the housing 12 towards the belt 18; the blade 14 inside the housing is thereby forced into scraping contact with the belt, since the housing is filled with water. As the blade material wears, more water is injected into the housing to take up the volume formerly occupied by the worn blade material.

Water being incompressible, the water in the housing acts in the manner of a solid strut, solidly transmitting actuation forces from the housing to the blade. The actuator (not shown) is powered by air, and is set up so as to maintain a constant (large) force between the blade and the belt. The constant pressure from the pneumatic actuator acts to keep the pressure of the water t a substantially constant value. So long as pressure is maintained on the lip 25 of the seal, the lip is forced into sealing contact with the blade. If pressure is lost, seal contact may be broken, which would allow air to enter the housing, which should be avoided.

In addition to the hydraulic seal 23, the blade 14 is acted upon also by a mud and dirt exclusion seal 45. The kind of dirt that is scraped off a conveyor belt depends of course on the material being conveyed on the belt; i a mine, for example, the material may be a slurry of very finely ground particles and water, caked onto the belt. Over a long period of service, the scraped-off dirt builds up on all exposed surfaces of the scraper. The dirt is so fine that it penetrates into the tiniest crannies. The dirt even behaves as if it were under pressure, since freshly scraped dirt piles up on old dirt, forcing the old dirt into the crannies.

Thus the problem of excluding dirt from the area of the seal 23, so that the seal can perform its function properly, and from the interior of the housing 12, should be regarded not as the mere deflection of small quantities of easy-to-handle dust, but as the very demanding problem of protecting those areas from large quantities of fine dirt being forced into the areas under pressure. In a mine, especially, the dirt is likely to be highly abrasive and corrosive.

(It will be understood that, in a mine, the "dirt" material scraped from the belt may include such valuable materials as gold dust.)

In the case of the hydraulic seal 23, the force with which the lip 25 was pressed into contact with the sides of the blade was not just dependent on the resilience of the lip, but was dependent also on the pressure of the water: the higher the pressure of the water, the more tightly the lip was forced into sealing contact against the sides (and edges) of the blade.

In the case of the dirt seal 45, there is no hydraulic pressure to assist in maintaining a good contact force between the lip 47 of the seal 45 and the blade 14. As with the hydraulic seal 23, the dirt seal 45 still has to accommodate all the deflections and distortions of the housing and blade.

Figure 5:
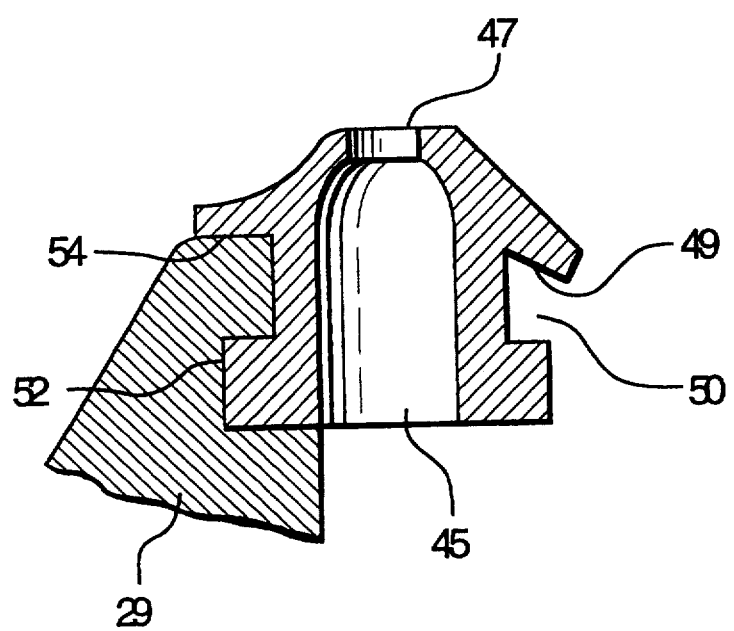
FIG. 5 is a cross-sectional view on line 5—5 of FIG. 4.

The profile of the dirt seal 45 is shown in FIG. 5. The upper wall 49 of the groove 50 in the profile is of a dovetail configuration; when the seal is inserted into the slot 52 of the blocks 29, the upper wall 49 becomes straightened out. The upper part of the seal 45 is thereby caused to rotate inwards towards the blade, whereby the lip 47 is pressed forcefully against the blade. Thus, the dovetail configuration of the upper wall 49 of the groove 50 is effective, not only to ensure a good contact between the upper wall 49 and the tip 54 of the block 29, but also the wall 49 and the tip 54 of the block 29, but also the dovetail configuration serves to keep the lip 47 pressed inwards tightly against the blade.

At the left and right edges of the dirt seal 45, again special precautions are taken because of the high thermal expansion of the blade. A plug 56, made of elastomeric material, fits over the fill-in piece 36, and engages against the end of the dirt seal 45, in the slot 52 thereof. The resilience of this plug 56 serves to assist in keeping the dirt seal 45 pressed against the blade under all conditions.

The plug 56 overlies the fill-in piece 36, and extends down the edge thereof. A flap 58 moulded onto the dirt seal 45 extends out over the plug 56.

A dirt seal constructed as described serves to keep the dirt scraped from the belt from passing through the dirt seal area, and down towards the hydraulic seal 23. It is eve so, advantageous to relieve the dirt seal of the heaviest attacks from dirt scraped from the belt, and to that end an apron plate 60 of stainless steel is bolted to the block 29. The apron plate 60 serves to receive the muddy, abrasive, corrosive, dirt material scraped from the belt 18, and serves to deflect that dirt down and away from the belt. The steeply sloping disposition of the apron plate 60 is important in this regard.

It is important that the scraped-off dirt be deflected and conveyed away. A scraper of the type described is highly efficient at removing dirt from the belt, but that efficiency would count for little if the resulting large quantities of dirt could pile up against the blade and belt. The apron plate 60 is effective to convey the dirt away.

The apron plate 60 is so dimensioned that when clamped tot he block 29 by means of the bolts 63, the pointed tip 65 of the plate 60 lies hard against the blade 14. To an extent, the apron plate therefore seals against the material of the blade.

A rear plate 67, made of plastic, is attached to the rear one of the blocks 29. The direction of travel of the belt 18 is from right to left in FIG. 2, so that the rear plate 67 serves as an abutment against which the blade rests due to the drag of the belt.

It may be noted that the tip 65 of the apron plate 60 lies a millimetre or two below the tip 69 of the rear plate 67. The arrangement of the plates 60, 67 is such that the tips 65, 69 of both plates are tight against the blade 14, ie the blade is clamped between the two. (the clamping cannot be too tight, because of course the blade must pass between the plates when wear-adjustment of the blade takes place).

This manner of clamping the blade between the plates, with the tip 69 of the rear plate slightly above the tip 65 of the apron plate, serves to (slightly) bias the blade 14 forwards, into the path of the oncoming belt. This is helpful in maintaining the proper angle of attack or presentation of the blade to the belt, over a long service life.

Another aspect that should be considered is that a conveyor belt sometimes runs in reverse. When a belt is switched off, for example, it has been known for the belt momentarily to fun backwards. The scraper preferably should be de-actuated when the belt is switched off, but it may happen that the blade of the scraper is being pressed forcefully against the belt when the belt is running backwards. To prevent fold-over of the protruding end 70 of the blade at this time, the tip 65 of the apron plate 60 should be kept high.

In the design of a belt scraper with an automatic adjustment to compensate for wear of the blade, it should also be considered what will happen if the automatic adjuster should fail to adjust. In this case, as the blade end 70 wears down, the tip 69 of the rear plate is the first portion of the scraper to contact the belt 18. This is acceptable, because the rear plate, being of plastic, will itself commence to wear, whereby there is little chance of the belt itself being damaged.

(In some prior art scrapers, in which a blade of metal rubs against the belt, when things go wrong the metal scraper blade can be sharpened to a razor edge, and then the scraper blade cuts the belt into ribbons.)

If the rear plate 67 should become worn down, the tip 65 of the apron plate 60 will start to contact the belt 18. However, again because of the steeply sloping installation angle of the apron plate 60, there is little tendency for the plate 60 to wear to a dangerous sharp edge. In operation of the scraper as described, periodic visual inspection, say on a weekly basis, would be all that was required to guard against the effects of malfunction of the automatic adjuster.

The blade 14 wears out eventually, and must be replaced. It is a good practice to renew the hydraulic seal 23 and the dirt seal 45 at the same time. At replacement, the new blade may be precoiled, and may be inserted from the inside of the housing 12, and fed out through the slot 1, or the new blade may be inserted through the slot 16 from outside the housing, and may be coiled into the housing.

For original equipment, the hydraulic seal 23 may be glued in place in the recess 27, to ensure that the seal remains in place during transport and storage, and during assembly and installation. The glue should be so placed that it does not interfere with the ability of the seal 23 to accommodate the required degree of movement of the lip 25, as described, both as regards the movement to accommodate the widening of the slot 16 under pressure, and the movement to accommodate the movement of the edges of the blade due to thermal expansion.

One of the reasons the seal apparatus as described is successful is that the manner in which the scraper blade is pressed against the belt does not require the blade to move relative to the housing. That is to say, if the belt is uneven as to its thickness, both the blade and the housing retract together; the blade is not called upon to retract into the housing. The fact that blade does not "pump" up and down through the seal greatly eases the demands on the seal-to-blade interface. Of course, the blade travels out of the housing, through the seal, when adjustment takes place, but that movement is not disruptive to the seal.

The seal designer is faced with quite different difficulties when considering the main width of the blade, as compared with the edges of the blade. Across the width of the blade, the problem is that, as mentioned the slot or gap 16 in the housing tends to open up when the housing is put under operating pressure. The designer takes precausions to stiffen the housing, to keep the deflection of the housing to a minimum, but even so a separation of the gap of 1 mm or more can be expected. The wider the blade, the greater the tendency of the gap to separate. The seal must be arranged to cater for this increase in the gap dimension, as described; that is to say, the seal lips must be flexible enough, and supported well-enough, that the lips maintain sealing contact with the blade even when the gap increases.

As regards sealing the side edges of the blade, the sealing problem is different. Under operating pressures, while the gap 16 in the housing does tend to open or expand, the housing has little tendency to become elongated; the structure of the housing is basically that of a tube, and the axial length of the tube (ie the dimension of the housing across the width of the belt) can be expected to remain undistorted, even when the housing is strongly pressurised. Thus, the seal does not have to cope with a change in the dimension of the housing across the width of the belt.

However, even thought the housing does not get longer, the blade itself has a tendency to expand and contract across the width of the blade.

The dimensions of the belt are not affected by the pressure of the water or other fluid inside the housing but rather by the temperature of the blade material. The temperature of the blade material may be well below freezing when the belt is shut down on a cold night, and yet on a hot day the same belt may be running at 35 degC, or more. (This problem does not arise so much if the belt is, for example, underground in a mine, because then the temperature is much less variable.)

Polyurethane, the material from which the blade is preferably made, unfortunately has a high coefficient of thermal expansion. The expansion of the belt is proportional to its width: if the belt is more than a metre or so wide, the width of the belt can change by as much as 15 mm due to expansion and contraction caused by changes in temperature and other environmental conditions.

The difficult problem faced by the designer is that of having to ensure that the seal does not allow the water to leak out, even under such extreme conditions. The lip of the seal must follow the contours of the edge profile of the blade, and must remain in firm but resilient contact with the edge profile, at both edges of course, even when the width of the blade is subject to such changes.

Figure 3:
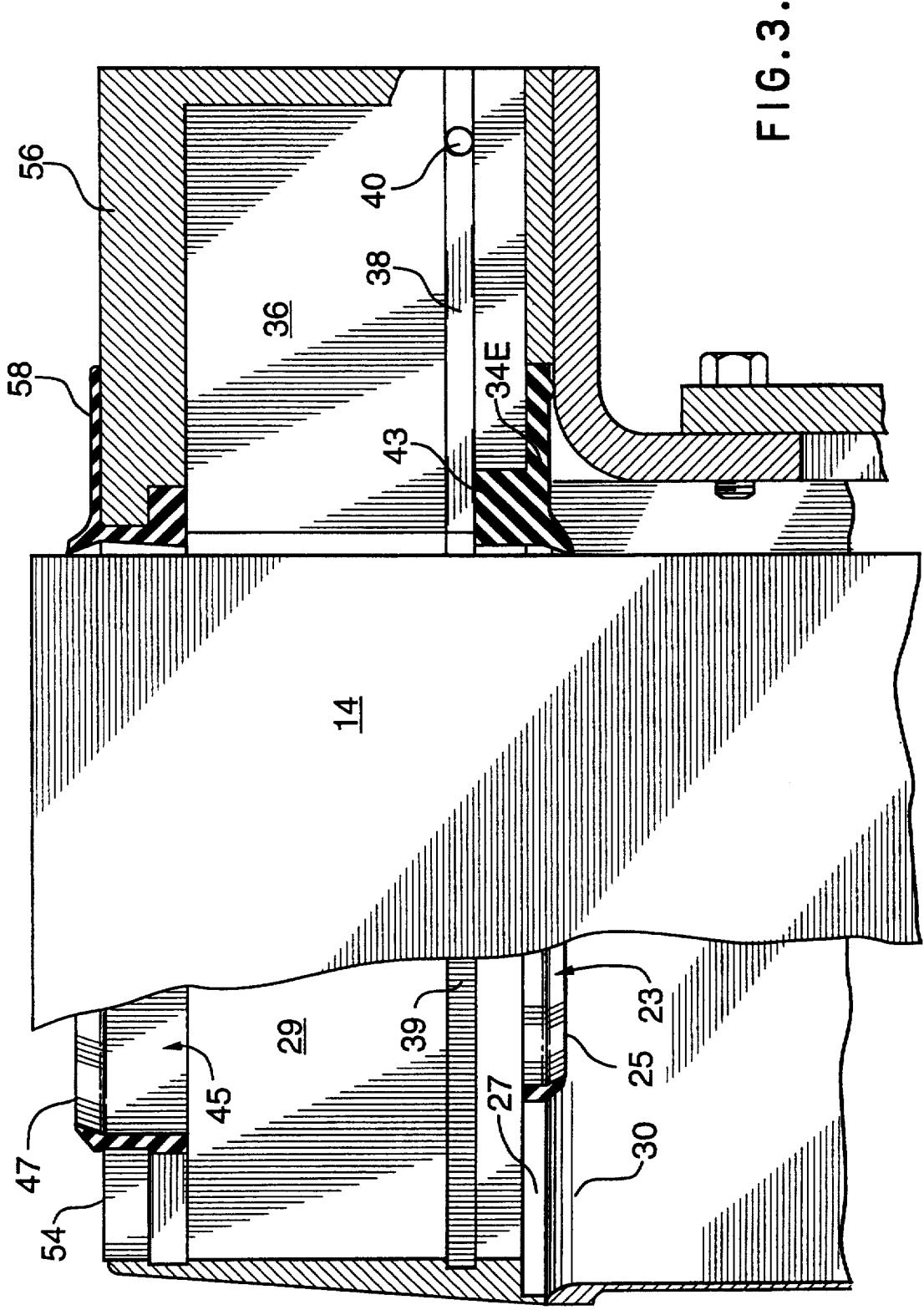
FIG. 3 is a front elevation, in cross-section, of the portion of the scraper shown in FIG. 2.

In FIG. 3, the seal was so mounted, in relation to the edge of the blade, as to permit the seal lip to move in the direction defined by the width of the conveyor belt; notonly was the seal lip able to flex, but the lip was carrie don a portion 34E of the seal that could also move to accommodate grosser movements of the seal lip. This arrangement can accommodate changes in the width of the blade of about 2 or 3 mm, without leakage.

The designer should provide for a greater magnitude of the movement of the seal lips at the edges of the blade than in the middle of the blade, and therefore preferably he makes the portion 34E wider than the rest of the portion 34, to give more flexibility at that critical area.

To accommodate greater changes in the width of the blade, the fill-in pieces located at the edges of the blade can be movable. As shown in FIG. 6, the fill-in piece 72 is movable with respect to the blocks 29. Springs 76, acting between the fill-in piece 72 and an abutment 78, urge the fill-in piece towards the edge of the blade 14. The abutment 78 is bolted immovably between the blocks.

One difficulty with the movable fill-in piece 72 is that friction on the piece, and on the seal itself, is high, whereby the piece does not move freely. However, movement of the fill-in piece is never required to be rapid, and the constant (though usually minor) shaking and vibration of the scraper during operation can effectively reduce the friction.

The springs 76 maintain the fill-in piece in relatively light contact with the edge of the blade, so that friction on the blade, due to the fill-in piece being pressed against the edge of the blade, is quite light.

When the fill-in piece is movable, as in FIG. 6, there is still a limit on how far the seal can stretch, to follow the expansion and contraction movement of the blade. The FIG. 6 arrangement is good for dimensional changes of the width of the blade of the order of 6 or 7 mm.

There is an alternative to allowing the seal to move to accommodate gross dimensional changes in the blade; and that is to pre-compress the blade. FIG. 7 shows a structure in which the left and right fill-in pieces 80 are in direct contact with the side edges 81 of the blade 14. It is arranged that the distance apart of the pieces 80 is 15 mm or so less than the nominal width of the blade. The designer assesses the coldest temperature likely to be encountered by the blade material (including during periods of non-operation of the conveyor belt), and determines what the width of the blade will be at that temperature. The distance apart of the pieces 80 is then made nominally the same as that width. At higher temperatures, therefore, as the blade expands, the blade becomes compressed between the pieces 80.

In fact, the amount of pre-compression need not be complete: it would be acceptable for the width of the blade to be, say, 10 mm smaller than the distance apart of the pieces 80, so long as other precautions were taken to ensure the seal lip does not break free from the edge of the blade, even if the blade were to contract another 3 or 4 mm, for example. Thus, it is advantageous to provide the measures as described in relation to FIG. 3, or FIG. 6, in addition to, or in conjunction with, the pre-compressed blade as described in relation to FIG. 7.

In FIG. 7, at normal temperatures, the blade is compressed between the fill-in pieces 80, and the side edges 81 of the blade rub against the complementary surfaces of the pieces. Inserts 83 of Teflon (TM) or other low-friction material may be fitted to the fill-in pieces 80 to form the complementary surfaces. The higher the running temperature, the more the blade expands widthways, and the more tightly the edges of the blade press against the low-friction inserts 83.

In FIG. 7, the polyurethane material from which the blade is made is compressed in order to insert the blade between the fill-in pieces.

Polyurethane material not only has the troublesome high coefficient of expansion, but the material is also subject to "creep". That is to say, if a piece of polyurethane is subjected to high imposed stresses, the material will, after a time, tend to change its shape, and to adopt the shape to which it is being urged by the stress.

Therefore, it might be considered that precompression can serve no useful purpose, because once the material creeps, any thermal expansion and contraction would then take place starting from the new dimension. The material will creep to new dimensions induced by the pre-compression, and if any thermal contraction should then occur, the material would break from the seal. However, the pre-compression used in the present case does not cause such creep; creep takes a period of several weeks or months in a material like polyurethane, whereas in the design as described the material is only compressed as it actually passes through the seal area. When the blade is wearing at normal rates, the blade material is only compressed for at most a few days, and the material can be expected to hold stress resiliently for a few days. When in the body of the housing, the material is not compressed.

When installing a new blade into the housing (the coil of polyurethane material may be expected to last a year or so under typical heavy duty conditions) it is good practice also to install a new hydraulic seal and a new dirt seal. The engineer may choose to stretch the rubber seals around the blade, then to fit the seals into the block assembly, and then to fit the block assembly onto the housing. Alternatively, the engineer may choose to assemble the seals and blocks to the housing first, and then insert the blade into the seals, inducing the required contraction of the blade by compressing the polyurethane.

Both of these methods of assembling the blade into the housing require some measure of skill and attention from the technician. However, the task is not too demanding, because polyurethane is fairly readily compressed.

Figure 8:
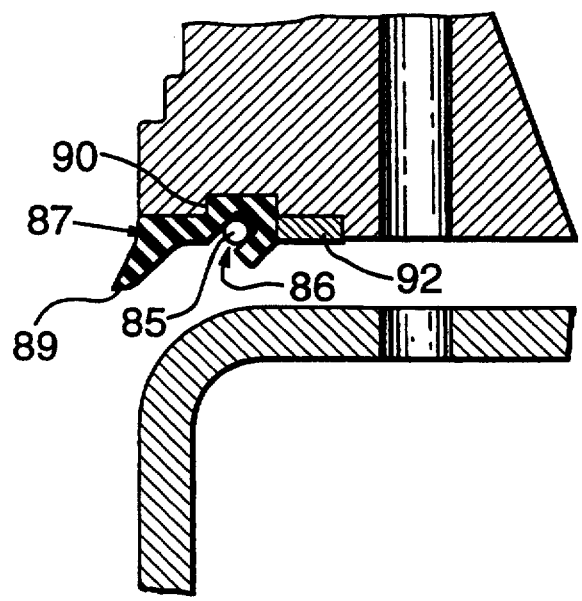
FIG. 8 is a view corresponding to (a portion of) FIG. 2 of a scraper, some of the components of which again have been modified.

FIG. 8 shows another modification, in which a supplementary cord 85 (of harder rubber) is inserted into a groove 86 in the main body 87 of the hydraulic seal. The groove 86 is so shaped as to define a lip 89, and so shaped the cord 85 is retained in the groove, behind the lip.

The lip 89 is therefore supported firmly, and yet the lip has a good conformability to the form of the housing. One of the problems that could sometimes occur with the simple bead or swelling 32 (FIG. 2) was that when the bead was compressed the material from the bead area would be extruded somewhat in the direction towards the seal lip, which could sometimes lead to distortion or twisting of the seal lip. The cord and lip seal of FIG. 8 provide a seal of excellent reliability, and yet the seal design provides isolation for the lip area from distortion arising from the heavy pinching of that area.

The shoulder 90 in the housing, and the corresponding ledge on the seal, serve to further isolate the pinchbased area of the seal, and the distortions thereof, from the lips area.

FIG. 8 also shows the provision of a metal strip 92 alongside the rubber seal. This serves to make sure the seal is contained and does not extrude outwards when the heavy pinching and distortion of the bead area takes place.

The raised lug 43 allows forces to be transmitted to the lip portion of the seal from outside the seal. It will be appreciated that the lip portion cannot be pushed against the blade by means of a force applied from outside the seal, because the bead portion of the seal is so tightly clamped that the lip portion would be isolated from such forces. The lug 43 permits the fill-in piece 36, or 80, to exert a force directly against the lip portion, to hold the lip portion against the blade. It is especially advantageous to hold the lip portion against the left and right side edges of the blade, whereby the lugs are provided just at the left and right ends, as shown, although, if necessary, a similar raised lug could be included all around the seal.

Figure 9:
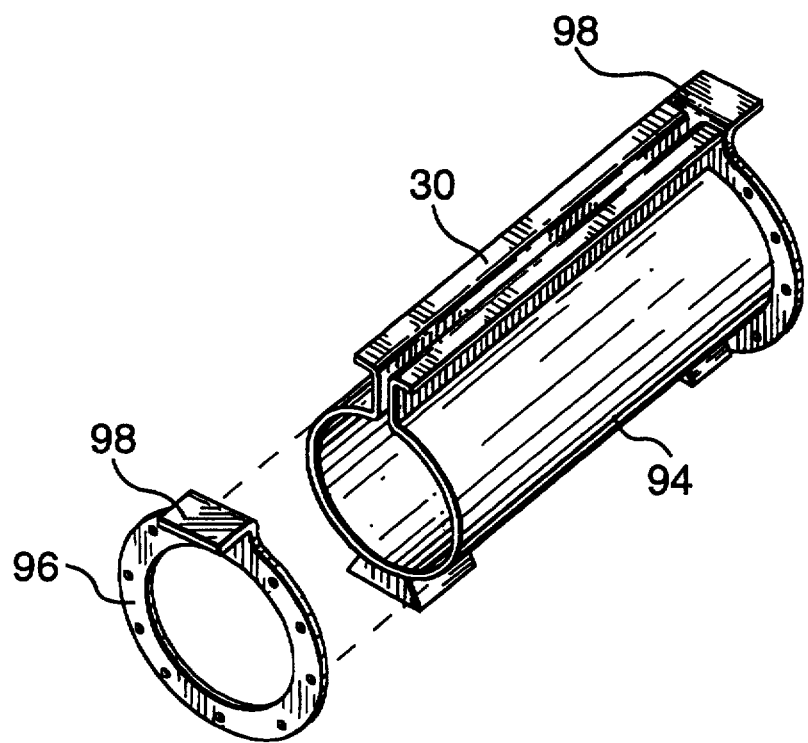
FIG. 9 is a view of a component of the scraper.

As shown in FIG. 9, the body 94 of the housing 12 is of folded sheet metal. End rings 96 are welded onto the ends of the body 94. A bent-over flange 98 of the end ring is thus placed on a level with the flange 30 of the body 94 to form a uni-planar surface to which the blocks 29 may be bolted.

However, although this surface is nominally flat, in practice a surface formed in that manner can be expected to be not perfect. The sealing system as described is effective to seal the blocks to this surface in a most efficient manner, and yet the lip portion can be presented to the blade in the most advantageous manner, notwithstanding the imperfections of the surface.

It was mentioned above that the seal may be glued in place into the recess, provided the lip was left free to move. In fact, the seal may be glued into the recess right up to the edge of the recess. It has been found that the lip portion of the seal can be given sufficient range of movement to accommodate the pressurised housing, even when the whole top surface of the seal is glued to the block. One key aspect with which the seal designer must be concerned is that the seal lip is not turned inside-out by the pressure inside the housing, which means that the lip must be adequately supported: gluing the whole top surface of the seal into the recess can enhance the resistance of the seal to such inversion.

I claim:

1. Scraper assembly, which is suitable for scrape-cleaning a moving conveyor belt, wherein:
    the assembly includes a scraper-blade, which is of a wide, thin, configuration;
    the housing comprises a body component and a cap component, which have opposing or facing surfaces, which are drawn together with fasteners;
    the cap component defines a slot, which is of a shape complementary to the blade, and the blade passes through the slot;
    the assembly includes a seal, which is arranged for sealing the blade to the slot;
    the seal is of elastomeric material;
    the seal includes a lip portion, a bead portion, and a connecting portion;
    the lip portion sealingly engages the blade;
    the arrangement of the assembly is such that the seal is secured between the said opposing surfaces when the surfaces are drawn together;
    the configuration of the opposing surfaces, in relation to the configuration of the seal, is such that, when the surfaces are drawn together,
    (a) the bead portion of the seal is comparatively heavily or tightly compressed between the opposing surfaces of the housing body component and the cap component;
    (b) the lip portion is free of contact with the opposing surface of the housing component;
    (c) the connecting portion is substantially not compressed, or is only comparatively lightly compressed, between the opposing surfaces;
    and the connecting portion is of such dimensions and arrangement that distortion of the bead portion due to heavy compression is substantially not transmitted to the lip portion.

2. Scraper assembly, which is suitable for scrape-cleaning a moving conveyor belt, wherein:
    the assembly includes a scraper-blade, which is of a wide, thin, configuration;
    the slot is of a shape complementary to the blade;
    the cap component defines a slot, which is of a shape complementary to the blade, and the blade passes through the slot;
    the assembly includes a dust or dirt seal, of elastomeric material, which is fitted to the housing cap component, and which is arranged to engage against the blade, and to prevent dust and dirt from entering the slot;
    the housing includes a cap component, which is formed with a retaining tongue for engagement with a complementary channel in the dust seal;
    the dust seal includes a lip portion and a channel portion;
    the channel portion is defined by channel walls, being surfaces of the material of the dust seal, including side walls and a base wall of the channel portion;
    the lip portion of the dust seal is positioned adjacent to one of the side walls;
    the dust seal is so formed that the said one of the side walls slopes inwards in a dovetail configuration;
    and the arrangement of the dust seal is such that when the channel portion is assembled over the corresponding tongue the said one of the side walls is thereby deflected towards the lip portion, and the lip portion is correspondingly deflected towards and into sealing contact with the blade.

* * * * *